Sept. 17, 1968  R. L. WEBER III  3,401,849
LOW FORCE METERING VALVE
Filed May 24, 1966  4 Sheets-Sheet 1
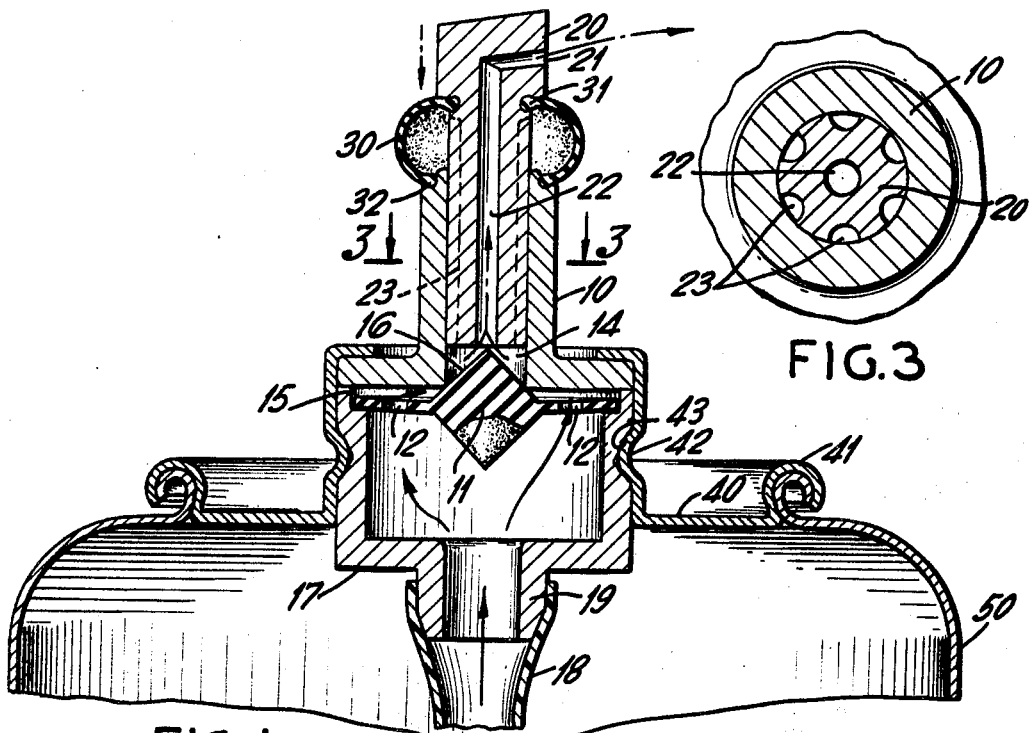
FIG. 1
FIG. 3
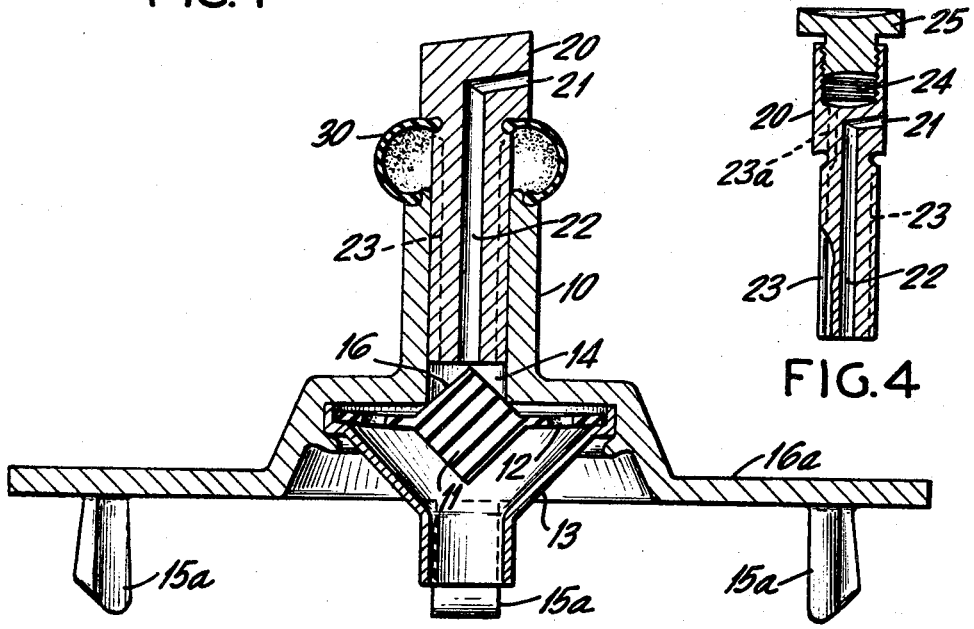
FIG. 2
FIG. 4
INVENTOR.
ROBERT L. WEBER III
BY
Hopgood & Calimafde
ATTORNEYS.

Sept. 17, 1968 R. L. WEBER III 3,401,849
LOW FORCE METERING VALVE
Filed May 24, 1966 4 Sheets-Sheet 2

INVENTOR.
ROBERT L. WEBER III
BY
Hopgood & Calimafde
ATTORNEYS.

Sept. 17, 1968  R. L. WEBER III  3,401,849
LOW FORCE METERING VALVE
Filed May 24, 1966  4 Sheets-Sheet 3

INVENTOR.
ROBERT L. WEBER III
BY
Hopgood & Calimafde
ATTORNEYS.

Sept. 17, 1968  R. L. WEBER III  3,401,849
LOW FORCE METERING VALVE
Filed May 24, 1966  4 Sheets-Sheet 4

INVENTOR.
ROBERT L. WEBER III
BY
Hopgood & Calimafde
ATTORNEYS.

United States Patent Office 3,401,849
Patented Sept. 17, 1968

3,401,849
LOW FORCE METERING VALVE
Robert L. Weber III, 49 Clapboard Hill Road,
New Canaan, Conn. 06840
Filed May 24, 1966, Ser. No. 552,524
12 Claims. (Cl. 222—402.1)

ABSTRACT OF THE DISCLOSURE

A dispenser is provided for an aerosol container comprising a housing having a chamber therein, the chamber having a retactable valve-actuating discharge member and nozzle coupled to one end thereof. The other end of the chamber has a fluid coupling means for fluidly communicating with the contents of an aerosol container. An annular chamber is located between the chamber and the fluid coupling means, the annular chamber supporting a diaphragm valve comprising a disc having a centrally located protrusion adapted to extend into and seal off the opening of the chamber.

---

This invention relates to aerosol valves and more particularly to metering valves.

Aerosol valves which dispense a metered quantity of product are well known in the art. Such valves normally contain two serially related valve members on either side of a chamber sized to contain a desired quantity of product to be dispensed. Finger pressure on the valve stem conventionally causes the upper valve to open to dispense the product while closing the lower valve. Release of finger pressure closes the upper valve and opens the lower valve to refill the chamber. The chamber is therefore normally under the same pressure as the product container. As the pressure in the product container is generally high, for example, as high as 40 lbs./in.² and higher, leakage is apt to occur through the upper valve of the chamber due to the continually acting high pressure, whereby the pressure may eventually spend itself. To avoid this as much as possible, biasing means, such as a spring, has been proposed to maintain the valve tightly in the closed position. However, the use of such springs generally means greater finger pressure to actuate the dispenser.

Another embodiment which has been proposed in U.S. Patent No. 3,142,420 involves a valve assembly which dispenses a metered quantity of the product upon release of a downward force. As in the dispenser described above, there are two serially related valve members on either side of a chamber, such that on depressing a retractable, valve-actuating discharge member, the lower high pressure valve, which is spring biased in the closed position, is opened to allow the product to enter the chamber while the upper valve is closed. Upon removing the finger pressure, the retractable valve-actuating discharge element releases itself from the lower valve which is immediately closed by its biasing spring, following which the retractable element on returning to its home position causes the upper valve to open and release the metered quantity of the product. Thus, the metering chamber is at atmospheric pressure except for the brief moment during actuation. As in the former device, because the lower valve is spring biased, generally high finger pressure is required to actuate the valve release.

Automatic devices which periodically activate aerosol container valves are used for such purposes as fumigation or dispensing room deodorants, insecticides or fragrances. Such automatic devices frequently employ aerosol units having metering valves. The force required to actuate the valve is derived from clockwork mechanisms which determine the intervals between product release. The force required to operate conventional aerosol valves and particularly conventional metering valves as stated hereinabove is generally high. It frequently exceeds one pound and may range as high as six pounds and even higher. To overcome this force, timer mechanisms having substantial torque characteristics are required. Such mechanisms are necessarily large and expensive. Reducing the force requiremnts for actuating a metering valve substantially reduces torque requirements of the timer, thereby permitting the use of inexpensive clock spring motor mechanisms. In addition, reducing the actuating force required to open the valves affords greater sensitivity of control, particularly where the inertia of moving parts is kept to a minimum.

It is thus the object of the invention to provide an improved metering valve for use with an aerosol container wherein low force may be employed to effect valve actuation.

Another object is to provide an aerosol metering valve in which leaking is greatly minimized, which is simple in construction and which is economical.

A still further object of the invention is to provide an improved metering valve assembly having a high pressure valve that does not require the use of biasing means to maintain it in sealing engagement on the high pressure side of the metering chamber.

These and other objects will more clearly appear when taken in conjunction with the following disclosure and the accompanying drawings, wherein:

FIG. 1 is a cross-sectional view of the valve assembly of the present invention mounted to a partially shown aerosol container;

FIG. 2 is a cross-sectional view of another embodiment of the valve of the present invention adapted to be attached to a separable aerosol container;

FIG. 3 is a cross-sectional view of the valve-actuating discharge member or stem of FIG. 1 taken along line 3—3;

FIG. 4 is a cross-sectional view of an embodiment of the valve-actuating discharge member or stem of the alternative construction for the valve of FIG. 1;

Figure 5:
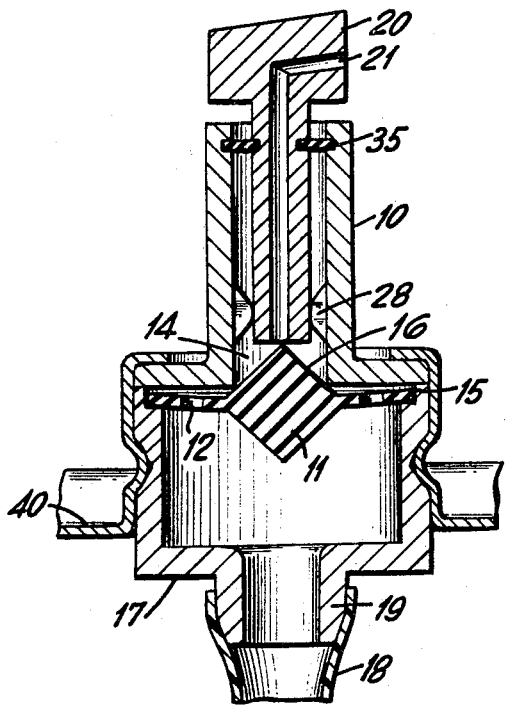
FIG. 5 is another embodiment of the present invention similar to FIG. 1.

In accordance with my invention, I provide a low force metering valve assembly for delivery metered quantities of an aerosol composition comprising, a cylindrical member having a chamber passing axially therethrough and a retractable valve actuating discharge member including a spray orifice associated with one end of the chamber, the other end of the chamber opening into a housing. The relationship of the valve-actuating discharge member to the chamber is such that when the retractable discharge member is depressed, a predetermined volume is defined in the chamber for metering a desired amount of aerosol composition. Means associated with the housing is provided for coupling the housing to an aerosol container so that the housing may be in fluid communication with the contents of the aerosol container. A diaphragm valve is provided comprising a disc of resilient material supported about its periphery within the housing and extending across the opening of said cylindrical member, the resilient disc having a centrally located protrusion which extends into and seals off the opening of the cylindrical member, the outer radial portion of the disc surrounding the protrusion having at least one perforation through which the product enters the metering chamber. The retractable discharge member has associated with it means for making sealing contact with the diaphragm during a down stroke whereby to close off the upper portion of the cylindrical chamber while forcing the diaphragm out of sealing engagement with the opening of the chamber. Thus, when the tractable valve-actuating discharge member is depressed such that the diaphragm is moved out of sealing contact with the chamber opening, the aerosol composition under pressure passes through the perforation of the diaphragm and enters the predetermined volume in the chamber, such that when the depressed discharge member is released, the diaphragm immediately returns in sealing engagement with the chamber opening by virtue of the pressure in the container to seal off the container, following which the predetermined volume of aerosol is released through said orifice as the retractable discharge member reaches home position.

I find that the resilient diaphragm valve is particularly advantageous in that it can be floatingly supported across the opening of the metering chamber and need not be biased in sealing position with the use of spring means. Because the floating valve is on the high pressure side of the chamber opening, the back-up pressure from the container keeps it in sealing position across the chamber opening until it is forced away from it by the downward stroke of the retractable valve-actuating discharge member. By using a diaphragm having a centrally located protrusion, it can be easily guided into sealing engagement with chamber opening.

Referring now to FIG. 1, the valve of the present invention is shown coupled to a conventional aerosol container valve mounting cup 40. Mounting cup 40 is shown sealingly mounted on container 50 by conventional means such as a rolled stem 41. The valve unit comprises a hollow upstanding cylindrical member 10 having a central chamber 14 which opens into housing 17. An outer annular groove 43 is provided to receive indentation 42 which is rolled or swaged in the mounting cup 40 to assemble the valve unit with the mounting cup. The lower portion of housing 17 has a short nipple 19 for receiving a product eduction or dip tube 18. Located between housing 17 and the upper portion 10 of the valve assembly is diaphragm valve member 11, preferably of resilient material, such as elastomeric material. Valve member 11 is preferably not clamped or otherwise attached to either member 10 or housing 17 but is loosely or floatingly held in annular groove 15. Centrally disposed of valve member 11 is a conical protrusion 16 which forms the sealing member of the valve. Perforations 12 surround the cone 16 to provide a flow path for the product. The valve member 11 has symmetrical conical protrusions to simplify assembly of the valve, that is, so that either side can be used. Its presence merely precludes the necessity for orienting member 11 during assembly. Within chamber 14 of cylindrical upper member 10 of the valve assembly is located a valve-actuating discharge member or stem 20.

Stem 20 is retractable in that it is free to vertically slide within chamber 14. Spray orifice 21 is in communication with a central bore 22. Longitudinal grooves 23 are formed on the exterior surface of the valve stem 20 as is shown in FIG. 3. A flexible annular bladder 30 of elastomeric material is fitted between stem 20 and the upstanding tubular portion of member 10. Bladder 30 sealingly engages the valve stem 20 and member 10 by means of beads 31 and 32 located inwardly of the annulus.

To operate the valve assembly, the user depresses retractable valve stem 20, thus causing the lower end of the valve stem 20 to sealingly engage conical portion 16 of the valve member 11. Further downward motion moves valve member 11 out of sealing engagement with the entrance to chamber 14, thereby opening a path of fluid flow between container 50 and chamber 14. The product in container 50 is under pressure supplied by a propellant, such as Freon. Pressure on the product within the container 50 causes the product to ascend dip tube 18, to pass through perforations 12 in valve member 11, and to enter chamber 14. Product in chamber 14 occupies the grooves 23 on the extremity of valve stem 20 and may also occupy the volume included within the rubber bladder 30. The sum of these volumes is the metering volume which determines the quantity of product to be dispensed upon removal of downward force on the valve stem 20. Upon removal of downward force, the stem is returned to its upper position by virtue of the elasticity of bladder 30 and the pressure of the product which acts on the area of the valve stem 20. Valve member 11 returns to sealing engagement with the entrance of chamber 14 and is forced tightly against said entrance by the pressure within the container. As valve stem 20 continues to retreat upwardly, the lower end becomes disengaged from the cone 16 thereby opening a path for the metered volume of product to escape through bore 22 to exit from orifice 21. Since the propellant is soluble in the product, sufficient propellant is evolved from the metered volume of product to force the product from the orifice 21. The small quantity of propellant gas remaining in chamber 14 clears any remaining product from orifice 21, thereby preventing any tendency of the product to clog the spray orifice.

The valve of the present invention requires very low actuating force since no valve springs or elastomers require compression. The forces resisting downward motion of the valve stem are the small restoring force offered by the rubber bladder 30, and the forces exerted by the propellant pressure acting on an area of valve member 11 which is equal to the area of chamber 14. Since this area is very small and rarely exceeds 1/10 of a square inch, the resultant force is very small. The total force required to actuate the valve of the present invention is in the order of about 6 to 8 ounces as compared with a force in the order of about 5 pounds required by conventional metering valves. The torque requirements of an automatic dispenser timer are further reduced by the fact that the valve of the present invention distributes the force requirements over a finite period of time. Conventional valves require a maximum force to initiate movement of the valve stem. The forces required by the present valve are initially the low force required to flex the bladder 30, subsequently the force required to sealingly engage cone 16, and finally the force required to disengage cone 16 from the entrance to chamber 14. This progressive application of forces further reduces the torque requirements of mechanized actuating means.

FIG. 2 shows an adaptation of the valve assembly of the present invention for use with a separate aerosol container having either a resilient puncturable seal or a conventional full flow aerosol valve. The valve of this embodiment is carried by a supporting mounting plate 16a which has gripping lugs 15a adapted to snap fit the rolled seam of a conventional aerosol container. Funnel shaped member or housing 13 is adapted to receive and depress the upstanding valve stem of a conventional aerosol valve to open that valve and maintain it in an open condition. Member 13, by slight modification, may be formed with a hollow needle extension which is insertable in a puncturable rubber seal found on valveless pressurized containers. Or in the alternative, the container may have a resilient sealing member associated therewith which is so configurated that the hollow needle can be sealingly inserted into the container via said sealing member, the sealing member thereafter closing upon removing of the needle. The sealing member enables communication with a dip tube located interiorly of the container, the dip tube being adapted to fit snugly over the needle. The embodiment of FIG. 2 may be incorporated in an automatic dispenser mechanism having a timer motor adapted to periodically depress valve stem 20. Such a unit would be fitted to an aerosol container. When the product container becomes exhausted, the unit is removed and fitted to a new container.

FIG. 4 shows a modified valve-actuating discharge member or stem 20 for use with the valves of the present invention. An auxiliary chamber 24 is provided in communication with one of the grooves 23 via channel 23a and is closed by a threaded cap 25. Rotation of the cap 25 with respect to valve stem 20 will vary the size of chamber 24. Chamber 24 thus becomes a variable volume metering chamber. The user can thereby adjust the volume of product dispensed in each actuation.

FIG. 5 shows another embodiment of the present invention similar to that of FIG. 1. As an alternative to the rubber bladder 30 of FIG. 1, the embodiment of FIG. 5 utilizes an annular rubber washer which is fitted and sealed in appropriate grooves on the inner wall of the upstanding valve body member 10 and a corresponding groove in valve stem 20. In place of the rubber washer, an O-ring may be employed. The embodiment of FIG. 5 further shows an alternative to grooves 23 shown in FIG. 3. Radial ribs 28 are formed within chamber 14 to provide guidance for the lower end of valve stem 20. The metering chamber volume is that within bore 14 and exterior to the valve stem 20.

Figure 6:
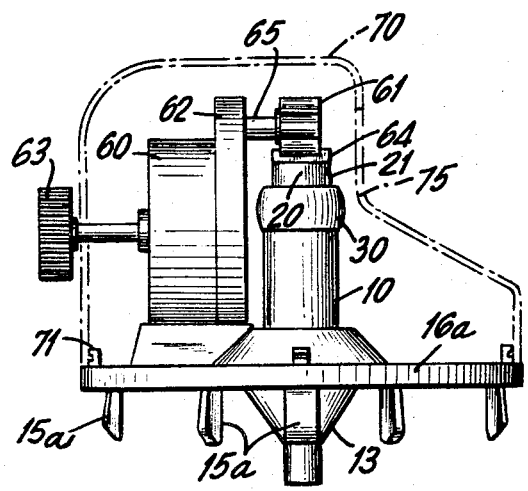
FIG. 6 is a side view of the valve of the present invention in association with an automatic timer actuating mechanism.
Figure 7:
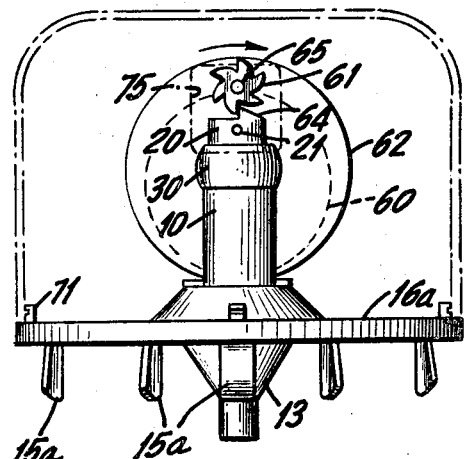
FIG. 7 is a front view of the embodiment of FIG. 6.

FIGS. 6 and 7 show the valve of the present invention in association with a timer mechanism. The valve is similar to the embodiment shown in FIG. 2 although any of the disclosed embodiments are equally applicable to automatic actuation. FIG. 6 is a side view of the valve and associated timer. The timer mechanism is comprised of a motor unit 60 which may be any well known clock spring or an electric motor. Integral therewith is a gear box 62 which contains reduction gearing. The output shaft 65 of the gear box 62 is equipped with a multiple lift cam 61. The motor may be wound or started by conventional knob means 63. An over cap 70 is shown in dotted outline enclosing the valve and timer mechanism. Over cap 70 may be snap fitted to mounting plate 16 by means of lug members 71. An appropriate aperture 75 is provided in alignment with spray orifice 21 to permit the dispensed product to escape to the atmosphere. Mounting plate 16a is attachable to an aerosol container by means of lugs 15a which intercept a rolled seam on the container. Funnel shaped member or housing 13 serves to depress the container valve stem or may be in the form of a hollow needle for puncturing a resilient seal on the pressurized container.

FIG. 7 is a front view of the mechanism of FIG. 6, the over cap 70 is again shown in dotted outline. FIG. 7 illustrates the relationship of aperture 75 (note FIG. 6) to spray orifice 21. The multiple lift cam 61 is shown in engagement with a sear 64 on the top of valve stem 20.

In operation, the user would wind or start the motor by appropriate manipulation of knob 63. As the timer motor 60 runs, shaft 65 rotates slowly causing sear 64 on the valve stem to ride the cam contour thereby gradually depressing valve stem 20. This charges the metering chamber of the valve of the present invention with product under pressure. As the cam 61 continues to rotate the sear 64 intercepts the radial portion of the cam contour thereby releasing the downward force on the valve stem 20 to allow it to retreat upwardly thereby dispensing a metered quantity of product through spray orifice 21 while the diaphragm valve seals off the container.

Figure 10:
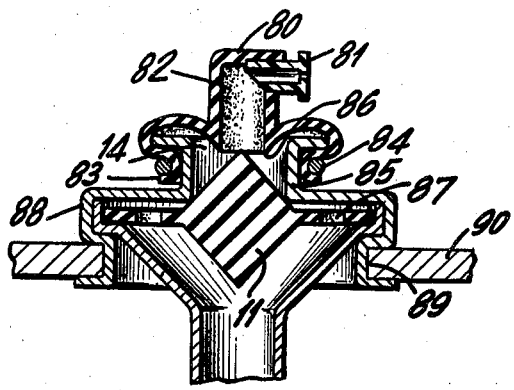

I have found that by utilizing a floating or loosely held diaphragm valve on the high pressure side of the chamber, I can use various embodiments of the retractable, valve-actuating discharge member. Thus, in FIG. 10 the retractable discharge member comprises a flexible cap 80 of elastomeric material having a plastic nozzle 81 force fitted into an opening in the cap so that the nozzle communicates with bore 82, which bore opens into chamber 14 into which diaphragm 11 protrudes in sealing engagment therewith. The cap has a peripheral flange 83 which is snugly fitted over the wall of cylindrical member 85 and fixed in position via a wire 84 peripherally encircling the flange. The cap is provided interiorly with an annular shoulder 86 for making sealing contact with the conical surface of the diaphragm valve. Thus, when flexible cap 80 is depressed, it causes annular shoulder 86 to move downwardly into sealing contact with the diaphragm valve, whereby the nozzle and bore 82 are completely sealed off. As diaphragm valve 11 is forced away from the opening of chamber 14, the aerosol product flows through perforation 87 into metered chamber 14. When the valve-actuating cap is released, the diaphragm immediately returns into sealing contact with the opening of chamber 14 following which, as the collapsible cap reaches home position, the metered aerosol product is released when chamber 14 communicates with bore 82 and nozzle 81. As shown in FIG. 10, cylindrical member 85 which is of metal enlarges into an apron 88 which is formed with an annular offset or flange at 89 for mounting to frame 90. Coaxially coupled to the interior of the apron is a funnel or housing 91 adapted to communicate with the interior of the aerosol container.

Figure 8:
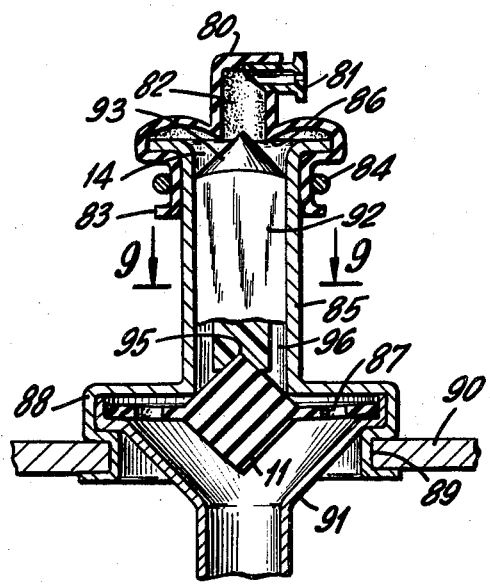
FIGS. 8 to 15 are illustrative of still further embodiments of the invention.
Figure 9:
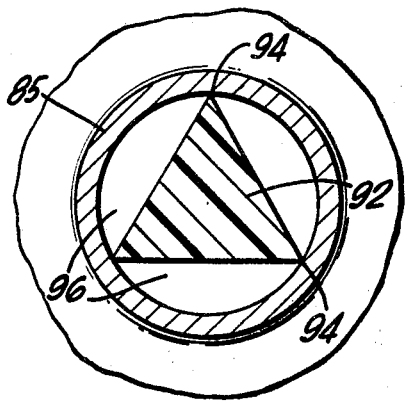

FIG. 8 is similar to FIG. 10 except that in order to provide a largre metered volume, cylindrical member 85 is made longer. However, in order for the retractable cap member to actuate diaphragm valve 11 on the down stroke, a floating stem 92 of polygonal cross-section is inserted into the hollow of the cylindrical member, the longitudinal edges 94 (note FIG. 9) being in sliding contact with the interior surface of the cylinder. The top of a floating stem is conically shaped at 93 and is located centrally of annular shoulder 86 of flexible cap 80. The bottom of floating stem 92 has a small conical recess 95 for receiving the top portion of the conical protrusion of diaphragm valve 11. Looking at FIG. 9 which is a cross-section of FIG. 8 taken at line 9—9, it will be noted that floating stem 92 of polygonal cross-section (e.g., triangular) provides spaces 96 for receiving and holding the aerosol product. As cap 80 is depressed, annular shoulder 86 makes sealing contact with conical portion 93 of the floating stem whereby chamber bore 82 is blocked off. On further depressing the valve-actuating cap, the floating stem is caused to move downward and push diaphragm 11 away from the chamber opening. When this occurs, the aerosol product flows through perforations 87 and fills up spaces 96 in the cylinder. Upon release of the cap, the pressure from the aerosol container pushes diaphragm 11 back into sealing contact with the chamber opening, following which the aerosol product in spaces 96 is relased through nozzle 81 as the valve-actuating cap returns to home position.

Figure 11:
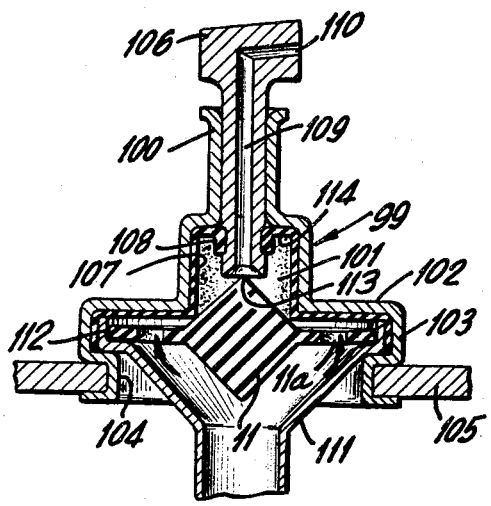

In FIGS. 11 to 14, another embodiment is shown in which a resilient annular cup-shaped seal of elastomeric material is used as an upper seal in conjunction with the lower diaphragm seal. Referring to FIG. 11, an upper housing 99 comprising a cylindrical member 100 of metal is shown which opens into an enlarged chamber 101 and into an apron 102 which is peripherally bent to form a flange 103 having a recessed annular offset portion 104 for mounting onto frame 105. Cylindrical portion 100 has a retractably mounted valve-actuating stem 106 in axial and sliding engagement therewith, the lower portion of the stem being coupled centrally to a resilient annular cup-shaped seal liner 107 which is molded to conform to the interior of the upper housing. The seal liner has a thickened central annular portion 108 which snap-fits into an annular recess near the end of stem 106, which stem has a bore 109 which communicates with nozzle 110. The valve assembly has a lower housing or funnel portion 111 for communication with the contents of an aerosol container. As shown in FIG. 11, diaphragm valve 11 is floatingly supported in annular chamber 112 via its radially extending rim portion 11a. The end of 113 of retractable valve-actuating member or stem 106 is conically bevelled inwardly to make sealing contact with the conical protrusion of diaphragm 11.

Figure 12:
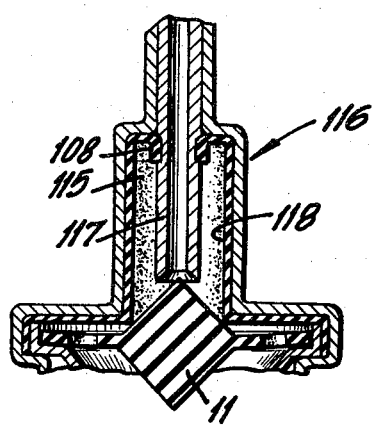
Figure 13:
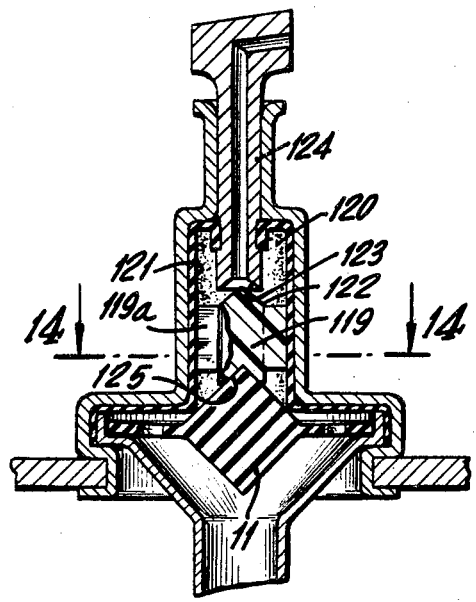
Figure 14:
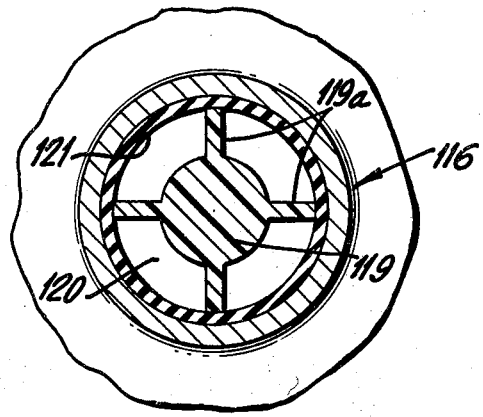

The annular cup-shaped elastomeric seal liner 107 as stated above is molded to conform to the inner contour of upper housing 99 so that it self-supportingly lies against the wall but is at least capable of movement from the wall in chamber 101. Being elastomeric, the liner is capable of resuming its self-supporting shape when stress is removed. Thus, as valve-actuating member or stem 106 is depressed downward, the liner in the region of 114 and areas adjacent it, is pulled away from the wall as it follows the movement of the stem. When the end 113 of the stem contacts valve 11 and moves it out of contact with the opening of chamber 101, the aerosol product immediately enters the metered chamber as shown by the arrows passing through the perforations. As will be noted, seal liner 107 serves as a tight seal and retains the metered quantity of the product in the chamber. When the down pressure on the stem is released, valve 11 is immediately caused to return in sealing engagement with chamber 101. The stem 106 is in the meantime returning to home position by virtue of the fact that portion 114 of the elastic seal liner wants to return to its original self-supporting position against the wall of the upper housing. Thus, as valve-contacting end 113 lifts off of diaphragm valve 11, the metered aerosol immediately is released through bore 109 and nozzle 110.

Where larger metered volumes are required, the constructions shown in FIGS. 12 and 13 may be employed. In FIG. 12, the chamber 115 in upper housing 116 may be made larger, the stem 117 being made longer accordingly. The annular cup-shaped sealing liner 118 is similarly constructed and molded to assume the inner configuration of the housing. If still larger volumes are desired, a floating auxiliary stem 119 of plastic (e.g., nylon or Delrin) is placed within an enlarged chamber, the auxiliary stem having radial wings 119a (note FIGS. 13 and 14) which ride along the wall of the chamber over the surface of seal liner 121. The upper portion 122 of auxiliary stem 119 has a conical protrusion which mates with the conically bevelled edge 123 of valve-actuating stem 124. The lower portion 125 is conically concaved to mate with the conical protrusion of diaphragm valve 11. As will be evident, the valve-actuating force is transmitted from main stem 124 through floating auxiliary stem 119 to valve 11.

Figure 15:
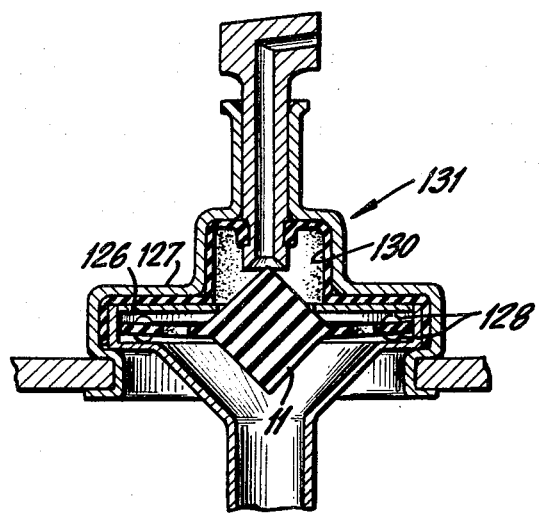

The embodiment of FIG. 15 is similar to that of FIG. 11 except that an annular metal washer 126 is provided intermediate the inner surface of apron 127 and valve 11. Additional means in the form of knobs 128 are provided about the rim of the diaphragm valve for floating positioning the valve in annular chamber or recess 129. As in FIG. 11, the inner wall of housing 131 has lined against it a molded sealing liner 130 to insure a tight seal. An advantage of using annular metal washer is that it provides a better seal against soft rubber-like material used in the diaphragm valve and, therefore, allows the diameter of the upper chamber to be increased so as to increase the metering volume.

As will be apparent from the foregoing description, the novel inventive concept is capable of a variety of embodiments. In its broad aspect, the invention comprises a cylindrical chamber having a retractable valve-actuating discharge member including a spray orifice sealingly coupled to one end of the shamber, the other end of the chamber having fluid-coupling means for fluidly communicating with the contents of the aerosol container. An annular chamber may be located between the cylindrical chamber and the fluid coupling means, in which chamber a diaphragm valve comprising a disc is supported by means of its periphery extending into the chamber. The diaphragm has a centrally located protrusion adapted to extend into and seal off the opening of the cylindrical chamber from the contents of the aerosol container, the outer radial portion of the disc near the periphery thereof having at least one opening therein. Means associated with the retractable discharge member is provided for sealingly contacting the diaphragm valve on the down stroke for moving said valve out of sealing contact with the chamber, while sealing off the nozzle from the chamber during the down stroke. Provision is made for biasing means associated with the retractable discharge member for returning it to home position upon completion of the down stroke.

In its preferred aspect, the diaphragm is made of elastomeric material, such as natural or synthetic rubber, the valve being preferably floatingly supported in the annular chamber and having a plurality of spaced perforations around its outer radial portion.

In another embodiment the retractable valve actuating discharge member may be sealingly coupled to the end of the chamber by means of an annular seal of elastomeric material wherein the annular seal also serves as a biasing means for returning the discharge member to home position. The annular seal may be cup-shaped to conform to the internal shape of the cylindrical chamber, the seal being self-supportingly fitted against the wall of the chamber and having a central opening coaxial with the valve stem. The central opening may preferably comprise a thickened annular rim coupled to and in sealing engagement with an annular recess in the stem, such that when the valve stem is depressed, a portion of the seal leaves the wall and follows the stem on the down stroke, whereby when the pressure is released the stem returns to its home position by virtue of the biasing action of the cup-shaped seal.

As one embodiment of a retractable valve-actuating discharge member, a valve stem may be employed coaxially mounted within the chamber, the stem having a bore running axially through it in communication with the nozzle, the end of the bore being adapted to make sealing contact with the diaphragm valve. The stem may have peripheral grooves running axially along its surface, the volume of the grooves in conjunction with the effective volume of the chamber constituting the desired metered volume.

As a still further embodiment of the retractable valve-actuating discharge member, an elastically collapsible cap of resilient material may be employed sealingly coupled to one end of the cylindrical chamber, the cap having an annular shoulder in its interior for making sealing contact with the diaphragm valve when the collapsible cap is depressed.

Where it is desired to employ a cylindrical chamber having an enlarged length to increase its effective volume, a floating stem of polygonal cross section may be employed within the chamber in slidable contact therewith, the floating stem having a convex conical surface at one end for making sealing contact with the annular shoulder of the cap and a conical recess at its other end for making contact with the diaphragm during the down stroke, the floating stem serving as a force-transfer element when the retractable discharge member is depressed.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a dispenser for an aerosol container, a metering valve assembly comprising, a housing having an aerosol flow chamber therein, a retractable valve-actuating discharge member including a spray nozzle sealingly coupled to one end of said housing, said nozzle communicating with said chamber, the other end of said chamber having fluid-coupling means for fluidly communicating with the contents of an aerosol container, and annular chamber located between said aerosol flow chamber and said fluid-coupling means, a diaphragm valve comprising a disc whose periphery extends into said annular chamber for support therein, said disc having a centrally located protrusion adapted to extend into and seal off the opening of said aerosol flow chamber from the contents of said aerosol container, the outer radial portion of said disc near the periphery thereof having at least one opening therein, means associated with said retractable valve-actuating discharge member for sealingly contacting said diaphragm valve on the down stroke for moving said valve out of sealing contact with said aerosol flow chamber, while sealing off the nozzle from said chamber during said down stroke, and biasing means associated with said retractable discharge member for returning it to home positon upon completion of the down stroke.

2. The metering valve assembly of claim 1 wherein said diaphragm valve is made of elastomeric material, said valve being floatingly supported in said annular chamber and having a plurality of spaced perforations at its outer radial portion.

3. The metering valve assembly of claim 2 wherein said retractable valve-actuating discharge member is sealingly coupled to said end of said chamber via an annular seal of elastomeric material, said annular seal also serving as the biasing means for returning said retractable discharge member to home position.

4. The metering valve assembly of claim 3 wherein said retractable valve-actuating discharge member comprises a valve stem coaxially mounted within said chamber, said stem having a bore running axially therethrough in communication with said nozzle, the end of said bore being adapted to make sealing contact with said diaphragm valve.

5. The metering valve assembly of claim 3 wherein said stem has peripheral grooves running axially therewith, said grooves taken in conjunction with the effective volume of the chamber constituting the desired metered volume.

6. The metering valve assembly of claim 2 wherein said retractable valve-actuating discharge member comprises an elastically collapsible cap of resilient material sealingly coupled to said aerosol flow chamber, said cap having said nozzle associated therewith, said cap having an annular shoulder disposed interiorly thereof for sealing contacting said diaphragm valve when said collapsible cap is depressed.

7. The metering valve assembly of claim 6 wherein said aerosol flow chamber is enlarged in length and has disposed therein a floating stem of polygonal cross section in slidable contact with the wall of said chamber, said floating stem having a convex conical surface at one end for making sealing contact with the annular shoulder of said cap, and a conical recess at its other end for making contact with said diaphragm during the down stroke, said floating stem serving as a force-transfer element when the cap is depressed.

8. The metering valve assembly of claim 4 wherein said annular seal of elastomeric material is cup-shaped and conforms to the internal shape of said aerosol flow chamber, said seal being self-supportingly fitted against the wall of said chamber and has a central opening coaxial with said valve stem, said central opening having a thickened annular rim coupled to and in sealing engagement with an annular recess in said stem, such that when the valve stem is depressed, a portion of the seal leaves the wall and follows the stem on the down stroke, whereby when pressure is released the stem returns to its home position by virtue of the biasing action of said cup-shaped seal.

9. The metering valve assembly of claim 8 wherein the aerosol flow chamber is enlarged in length and has disposed therein a floating stem in slidable contact with the wall thereof, peripheral portions of said stem defining aerosol-receiving spaces between the stem and the chamber wall, said floating stem having a convex conical surface at one end for making sealing contact with the annular shoulder of said cap, and a conical recess at its other end for making contact with said diaphragm during the down stroke, said stem serving as a force-transfer element when the cap is depressed.

10. The combination with the valve assembly of claim 1 of timing means for actuating said dispenser, including a clock mechanism supported in cooperable relation with said valve assembly, output means coupled to said clock mechanism, and means coupled to said output means for releasably actuating said retractable discharge member, said coupling means extending to said retractable discharge means and being adapted to depress said discharge means according to a predetermined time cycle and to release it after the metered chamber is filled with aerosol product.

11. In a dispenser for an aerosol container, a valve assembly comprising, a housing having an aerosol flow chamber therein, a retractable valve-actuating discharge member including a spray nozzle sealingly coupled to one end of said housing, said nozzle communicating with said chamber, the other end of said housing having fluid-coupling means for fluidly communicating with the contents of an aerosol container, an interior annular groove located within said housing near the upper end thereof for supporting a diaphragm valve in valve-actuating relationship with said aerosol flow chamber, a diaphragm valve comprising a disc whose periphery extends into said annular groove and is loosely supported therein, said disc having a centrally located protrusion adapted to extend into and seal off the opening of said aerosol flow chamber from the contents of said aerosol container; means associated with said retractable valve-actuating discharge member for contacting said diaphragm valve on the down stroke for moving said valve out of sealing contact with said chamber, and means for returning said retractable discharge member to home position upon completion of the down stroke.

12. In a dispenser for an aerosol container, a valve assembly comprising, a housing having an aerosol flow chamber therein, a retractable valve-actuating valve stem including a spray nozzle sealingly coupled to one end of said housing, said nozzle communicating with said chamber through a bore in said valve stem, the other end of said housing having fluid-coupling means for fluidly communicating with the contents of an aerosol container, a valve for selectively sealing off the opening of said aerosol flow chamber from the contents of said aerosol container, a cup-shaped annular seal of elastomeric material having a shape conforming to the internal shape of the aerosol flow chamber, said seal being self-supportingly fitted against the wall of said chamber and leaving a central opening coaxial with said valve actuating stem, said seal having a rim surrounding said central opening, said rim being coupled to and in sealing engagement with said stem passing therethrough, means associated with said retractable valve stem for sealingly contacting said valve on the down stroke for moving said valve out of sealing contact with said chamber, while sealing off the nozzle from said chamber during said down stroke such that when the valve stem is depressed, a portion of said cup-shaped seal leaves the wall and follows the stem on the down stroke, whereby when pressure on the stem is released, the stem returns to its home position.

References Cited
UNITED STATES PATENTS

| | | | |
|---|---|---|---|
| 2,681,752 | 6/1954 | Jarrett et al. | 251—331 X |
| 2,862,648 | 12/1958 | Cooksley et al. | 222—402.24 |
| 2,963,265 | 12/1960 | Goodspeed | 251—353 X |
| 3,272,403 | 9/1966 | Alexander | 222—402.1 |
| 3,301,444 | 1/1967 | Wittke | 222—402.20 |
| 2,363,521 | 11/1944 | Grant | 222—402.25 X |
| 3,138,304 | 6/1964 | Raens | 222—402.25 X |

FOREIGN PATENTS 893,717  4/1962  Great Britain.

ROBERT B. REEVES, *Primary Examiner.*

F. R. HANDREN, *Assistant Examiner.*